(12) United States Patent
Khakpour et al.

(10) Patent No.: US 10,452,381 B2
(45) Date of Patent: Oct. 22, 2019

(54) FRAGMENTED UPDATING OF A DISTRIBUTED DEVICE USING MULTIPLE CLIENTS

(71) Applicant: OpenPath Security Inc., Marina Del Rey, CA (US)

(72) Inventors: Amir Reza Khakpour, Santa Monica, CA (US); Alexander A. Kazerani, Santa Monica, CA (US); Samy Kamkar, Los Angeles, CA (US); Robert J. Peters, Culver City, CA (US)

(73) Assignee: OPENPATH SECURITY INC., Marina Del Ray, CA (US)

( * ) Notice: Subject to any disclaimer, the term of this patent is extended or adjusted under 35 U.S.C. 154(b) by 238 days.

(21) Appl. No.: 15/478,429

(22) Filed: Apr. 4, 2017

(65) Prior Publication Data
US 2018/0285089 A1 Oct. 4, 2018

(51) Int. Cl.
| | |
|---|---|
| *G06F 9/445* | (2018.01) |
| *G06F 8/65* | (2018.01) |
| *H04L 29/08* | (2006.01) |
| *H04W 12/08* | (2009.01) |
| *H04L 12/24* | (2006.01) |
| *H04L 9/32* | (2006.01) |
| *H04L 29/06* | (2006.01) |
| *H04W 4/80* | (2018.01) |

(52) U.S. Cl.
CPC .............. *G06F 8/65* (2013.01); *H04L 9/3247* (2013.01); *H04L 41/082* (2013.01); *H04L 67/12* (2013.01); *H04L 67/34* (2013.01); *H04L 69/14* (2013.01); *H04W 12/08* (2013.01); *H04W 4/80* (2018.02)

(58) Field of Classification Search
CPC ....................................................... G06F 9/445
See application file for complete search history.

(56) References Cited

U.S. PATENT DOCUMENTS

| | | | | |
|---|---|---|---|---|
| 5,675,782 | A * | 10/1997 | Montague ............. | G06F 21/604 707/999.01 |
| 9,032,387 | B1 * | 5/2015 | Hill ......................... | G06F 8/61 717/173 |
| 2002/0138586 | A1 * | 9/2002 | Paleiov ................. | H04L 51/063 709/207 |

(Continued)

*Primary Examiner* — Jae U Jeon
(74) *Attorney, Agent, or Firm* — Ansaro Katiraei LLP; Arman Katiraei; Sadiq Ansari

(57) ABSTRACT

Disclosed are systems and methods for updating a distributed system device with an update that a system controller fragments and propagates to the system device by way of two or more third party clients. The system controller manages client access rights to a service accessible at different distributed system devices. The system controller has first network connectivity with which to remotely distribute different fragments of an update to different clients. Each system device controls access to the service at different a site and has (i) second network connectivity with which the different clients propagate different fragments of the update to the system device upon entering communication range with the system device, (ii) memory storing different sets of fragments for the update based on different times at which the clients propagate the fragments, and (iii) a processor applying the update once all fragments of the update to the memory.

16 Claims, 8 Drawing Sheets

(56) References Cited

U.S. PATENT DOCUMENTS

| | | | | |
|---|---|---|---|---|
| 2004/0242240 A1* | 12/2004 | Lin | ............... | H04W 8/245 |
| | | | | 455/456.3 |
| 2004/0268145 A1* | 12/2004 | Watkins | ............ | G06F 21/57 |
| | | | | 726/24 |
| 2005/0089011 A1* | 4/2005 | Bender | ............ | H04W 24/02 |
| | | | | 370/349 |
| 2007/0239887 A1* | 10/2007 | Curtis | ............ | H04L 69/16 |
| | | | | 709/234 |
| 2009/0172420 A1* | 7/2009 | Zayas | ............ | G06F 21/575 |
| | | | | 713/194 |
| 2012/0051224 A1* | 3/2012 | Olgaard | ............ | H04L 43/50 |
| | | | | 370/241 |
| 2013/0185564 A1* | 7/2013 | Jaber | ............ | G06F 21/572 |
| | | | | 713/176 |
| 2014/0028468 A1* | 1/2014 | Grady | ............ | G08C 15/00 |
| | | | | 340/870.03 |
| 2014/0161006 A1* | 6/2014 | Hall | ............ | H04L 12/1845 |
| | | | | 370/310 |
| 2014/0298490 A1* | 10/2014 | Clark | ............ | G06F 21/40 |
| | | | | 726/34 |
| 2015/0281791 A1* | 10/2015 | Tanaka | ............ | H04N 21/47214 |
| | | | | 725/61 |
| 2015/0382035 A1* | 12/2015 | Li | ............ | H04N 21/23608 |
| | | | | 725/62 |
| 2016/0062445 A1* | 3/2016 | Choi | ............ | G06F 1/325 |
| | | | | 713/320 |
| 2017/0264956 A1* | 9/2017 | Gerhards | ............ | H04N 21/4583 |
| 2018/0167831 A1* | 6/2018 | Fang | ............ | H04W 24/10 |

* cited by examiner

FRAGMENTED UPDATING OF A DISTRIBUTED DEVICE USING MULTIPLE CLIENTS

BACKGROUND ART

Electronic devices are a combination of hardware and software. Software updates improve device performance and security by introducing new functionality and correcting existing functionality.

The Internet and network connectivity has made it easy to remotely administer updates to devices deployed in different regions. However, not all devices have network access to a remote administrative source from which to obtain the updates. Some devices lack long-range connectivity to connect to the administrative source. Other devices may have the necessary wired or wireless network interfaces, but may not have network access because of placement, power requirements, or security.

This is true for Internet-of-Things (IoT) devices with limited connectivity to other nearby devices rather than all devices on the Internet. Some such devices rely on Bluetooth, Bluetooth Low Energy (BLE), Near Field Communication (NFC), or other short-range low-power wireless connectivity for internetworking with other nearby devices because there is insufficient battery, physical space, processing power, or need for longer-range higher-power WiFi, 3G, 4G, or Long Term Evolution (LTE) connectivity.

Nevertheless, there is a need to propagate software updates from a remote administrative source to these devices even when there is no direct or permanent network connectivity between the devices and the administrative source. Moreover, there is need to propagate the updates securely and without special purposed hardware or other equipment.

BRIEF DESCRIPTION OF THE DRAWINGS

A preferred embodiment for fragmented updating of a distributed device using multiple clients will now be described, by way of example only, with reference to the accompanying drawings in which.

DETAILED DESCRIPTION

Figure 1:
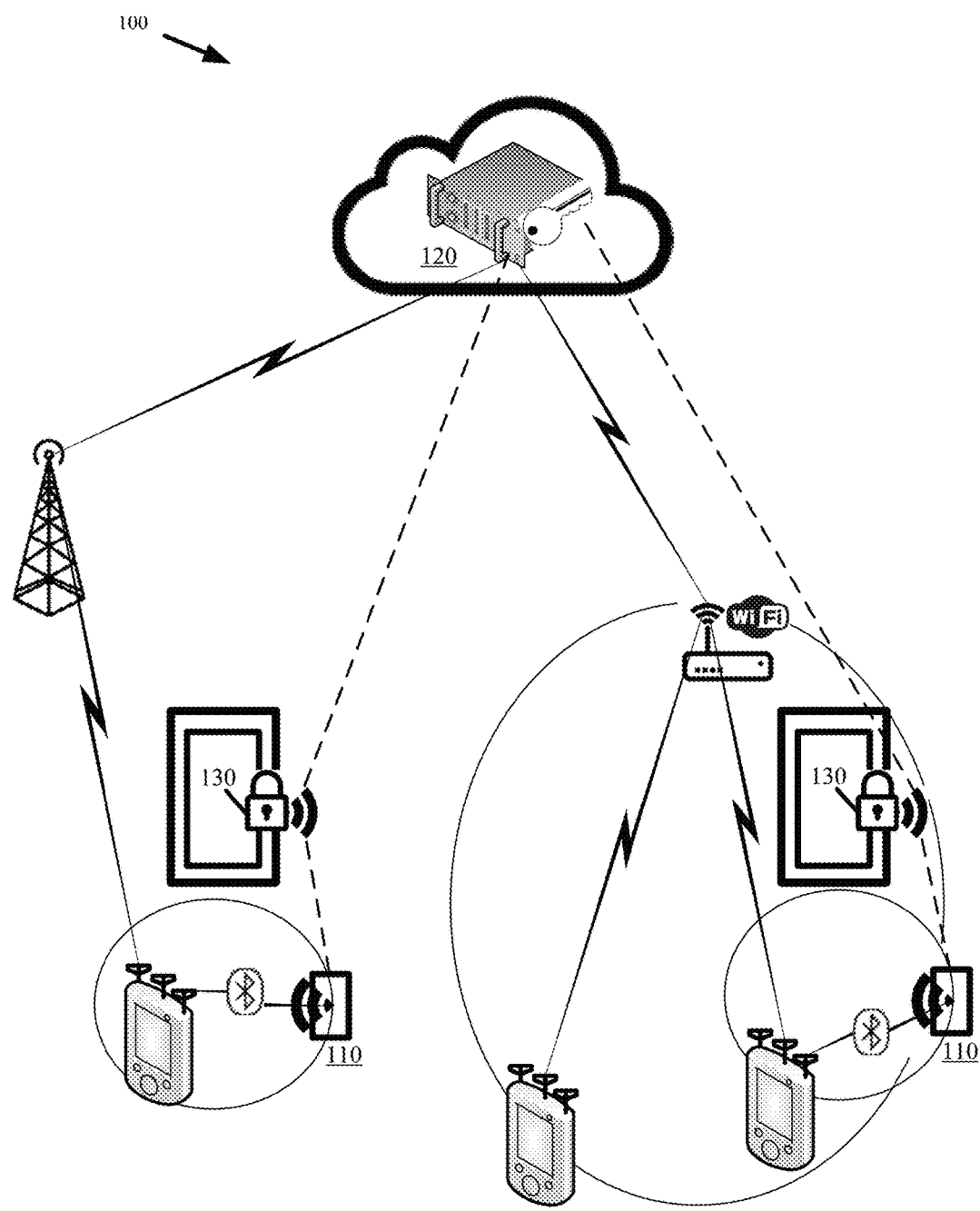
FIG. 1 illustrates an access control system in accordance with some embodiments.

Provided are systems and methods for updating a distributed system device with an update that a system controller fragments and propagates to the system device by way of two or more transitory and independent third party clients. Each of the third party clients delivers a fragmented segment of the update to the system device when in communication range of the system device or when requesting a service from the system device. The system controller leverages the third party clients for indirectly updating the system device because the system device is not directly connected to the system controller or may otherwise be disconnected from the system device, and because the system controller is at least intermittently communicably coupled to the third party clients and the third party clients periodically come in range of and communicate with the system device.

The disclosed embodiments apply to any system with a set of devices operating remotely and disconnected from a system controller. The set of devices provides a distributed service. The lack of connectivity between the set of devices and system controller may be due to power, cost, or network constraints. In some embodiments, the set of devices include Internet-of-Things (IoT) devices that contain wireless connectivity, but the wireless connectivity may be limited to short-range wireless radios and protocols such as Bluetooth, Bluetooth Low Energy (BLE), or Near Field Communication (NFC) for power and cost considerations. In some other embodiments, the remote or isolated location of the IoT devices prevents them from having any kind of wireless or wired connection to the system controller even when configured with the requisite hardware.

The system controller manages client permissions to access the service from one or more of the set of devices. The system controller also updates the set of devices. In some embodiments, the updating involves changing functionality and operation of the set of devices or changing permissions stored on the set of devices. The updates are embodied as software patches or firmware executed by the set of devices. Without an always-on network connection between the system controller and the set of devices, the disclosed embodiments leverage the transitory and independent third party clients as alternative vehicles with which the system controller can deliver the updates to the set of devices. Security is maintained by providing each client with a mere fraction or fragment of the entire update, thereby preventing any client from hacking, spoofing, or poisoning the update. Digital signatures, encryption, and checksums provide additional safeguards for detecting a fragment originator and detecting tampering of fragment contents.

Supported and compatible third party clients that can be leveraged by the system controller for the fragmented updating of some embodiments are smartphones running the iOS, Android, Windows, or other operating systems. Other supported and compatible third party clients include tablets, laptop computers, other wireless mobile devices, and IoT devices that support communications or messaging over at least one network and are used by system users for requesting access to one or more services from the distributed system devices.

In preferred embodiments, the third party clients support long-range wireless connectivity such as 3G, 4G, Long Term Evolution (LTE), or 5G connectivity for interfacing with the system controller. The clients may use the same connectivity or different short-range wireless connectivity such as Bluetooth, BLE, or NFC for interfacing with the system devices when in range of the system devices.

In some embodiments, a particular client interfaces with a system device by requesting access to a service controlled by the system device when the particular client is in range of the system device and with the system device performing a control decision to allow or prevent the client from accessing the service. Communications between a client and a system device as well as those between the client and the system controller can be conducted based on an exchange of HyperText Transfer Protocol (HTTP) or HTTP Secure (HTTPS) messaging over connection-oriented protocols such as the Transmission Control Protocol (TCP) or connectionless protocols such as the User Datagram Protocol (UDP).

In some embodiments, the clients first register with the system controller in order to obtain permissions to access the system provided service from one or more of the system devices. The client registration involves providing identifying information about a particular client or user of the client to the system controller. The identifying information is unique to the client or user and may include a telephone number, International Mobile Subscriber Identity (IMSI), or login credentials of the user as some examples. In return, the system controller provides certain service access privileges to the particular client at one or more of the system devices. The access privileges of the particular client can be configured by an administrator based on employment status, need, service subscription, payment, importance, clearance, other security policies, or rights permissions. In some embodiments, the system controller distributes the access privileges to the system devices by way of the fragmented updates that the clients propagate to system devices on behalf of the system controller. Once updated, the system devices can operate in a standalone manner independent of the system controller. In other words, the devices can independently authorize client access to a requested service based on the updated privileges. An interrogating signal sent by a system device or trigger detected by the client can initiate the service request exchange between the client and the system device.

In some embodiments, the client registration further involves installing an application, script, or other code on the client devices. The application provides the interface and facilitates the messaging exchange between the client and the system devices, and between the client and the system controller. The system controller interfaces with a client by establishing a connection to the application running on the client device. In some embodiments, the client device periodically initiates the connection to the system controller or initiates a connection when the application is used to request the service or is otherwise executed on the client. In some other embodiments, the system controller can initiate connections to different client devices as needed provided the client devices are powered on and have network connectivity.

Over established connections between the system controller and one or more clients, the system controller can pass authorization tokens or other credentials that the client applications then use to request service from the distributed set of system devices. The system controller optionally passes update fragments to the different clients by way of the established connections when one or more of the system devices require updating.

Preferred embodiments are directed to an access control system. However, as described above, the updating methodologies presented herein are applicable to any distributed system in which clients request access to a service through devices that are unable to directly connect with a system controller. FIG. 1 illustrates an access control system 100 in accordance with some embodiments.

The access control system 100 is formed from a set of readers 110 and a remote administrative server 120. The set of readers 110 correspond to the system devices while the remote administrative server 120 corresponds to the system controller. The access control system 100 is linked to and controls a set of electronic locks 130.

The set of readers 110 are wireless devices placed adjacent to the physical entry points that users attempt to access with their clients (i.e., mobile devices). Accordingly, each reader of the set of readers 110 includes at least one wireless radio for communicating with the clients over at least one of the supported networks. In some embodiments, the wireless connectivity of a particular reader is sufficient for short-range communications with clients that are within a few feet from that particular reader, but insufficient or inadequate for long-range communications with the remote administrative server 120. Each reader 110 controls access to a particular entry point by unlocking and locking an electronic lock 130 of the particular entry point. The reader 110 may be integrated with the electronic lock and directly manipulate the locking mechanism. The reader 110 may also be decoupled from the electronic lock and send signals that control operate the electronic lock. Each reader 110 has memory and processing logic. The memory stores access privileges granted to different clients as well as update fragments that the reader 110 receives from different clients according to the embodiments presented herein. The processing logic authorizes client access based on the stored access privileges and messaging exchanged with a client.

The remote administrative server 120 is a cloud based server or machine for managing client access permissions and for indirectly updating the set of readers 110 via the clients. In some embodiments, the remote administrative server 120 interfaces with the clients in order to issue and revoke credentials, tokens, or other messaging used by the clients to access different entry points or request service from the set of readers 110. The remote administrative server 120 also interfaces with the clients in order to pass different fragments of an update to different clients for the clients to then pass on to the readers 110. The interface is established using a network connection between the clients and the remote administrative server 120. The interface can be established over a long-range wireless network connection, such as 4G or LTE network connectivity. Alternatively, the interface can be established with WiFi connectivity. As noted above, the initial interface between the clients and the remote administrative server 120 is established in order to register the clients with the remote administrative server 120 and assign access privileges to the clients, wherein the registration further involves installing the system application on the devices of the registered clients.

The indirect propagation of the updates from the system controller or remote administrative server 120 to the system devices or readers 110 using the third party clients is necessitated by the lack of direct or permanent connectivity between the system controller and the system devices. The third party clients, however, pose a security risk with regards to spoofing, hacking, or poisoning an update before it reaches the system devices because the clients are not under control of the system controller. To mitigate against the risk, the system controller partitions an update targeting a particular system device into different fragments. The system controller distributes the fragments to different clients using one or more of the available long-range wireless connection paths (e.g., WiFi, LTE, etc.). Two or more different clients then perform a distributed propagation of all the fragments to the particular system device on behalf of the system controller when the clients come in the short-range wireless range of that particular system device. The partitioning prevents any client from having access to the complete update. Over time, the particular system device receives all the fragments and is able to locally rebuild and apply the complete update. The partitioning also produces a segment that cannot be executed and is indecipherable in-and-of itself.

Nevertheless, there remains the possibility that a client tampers with a fragment or attempts to inject a malicious fragment as part of the distributed updating of a system device. Some embodiments implement additional safeguards to detect and prevent any such fragment tampering or injection. These additional safeguards are provided using checksums, encryption, and digital signatures.

Figure 2:
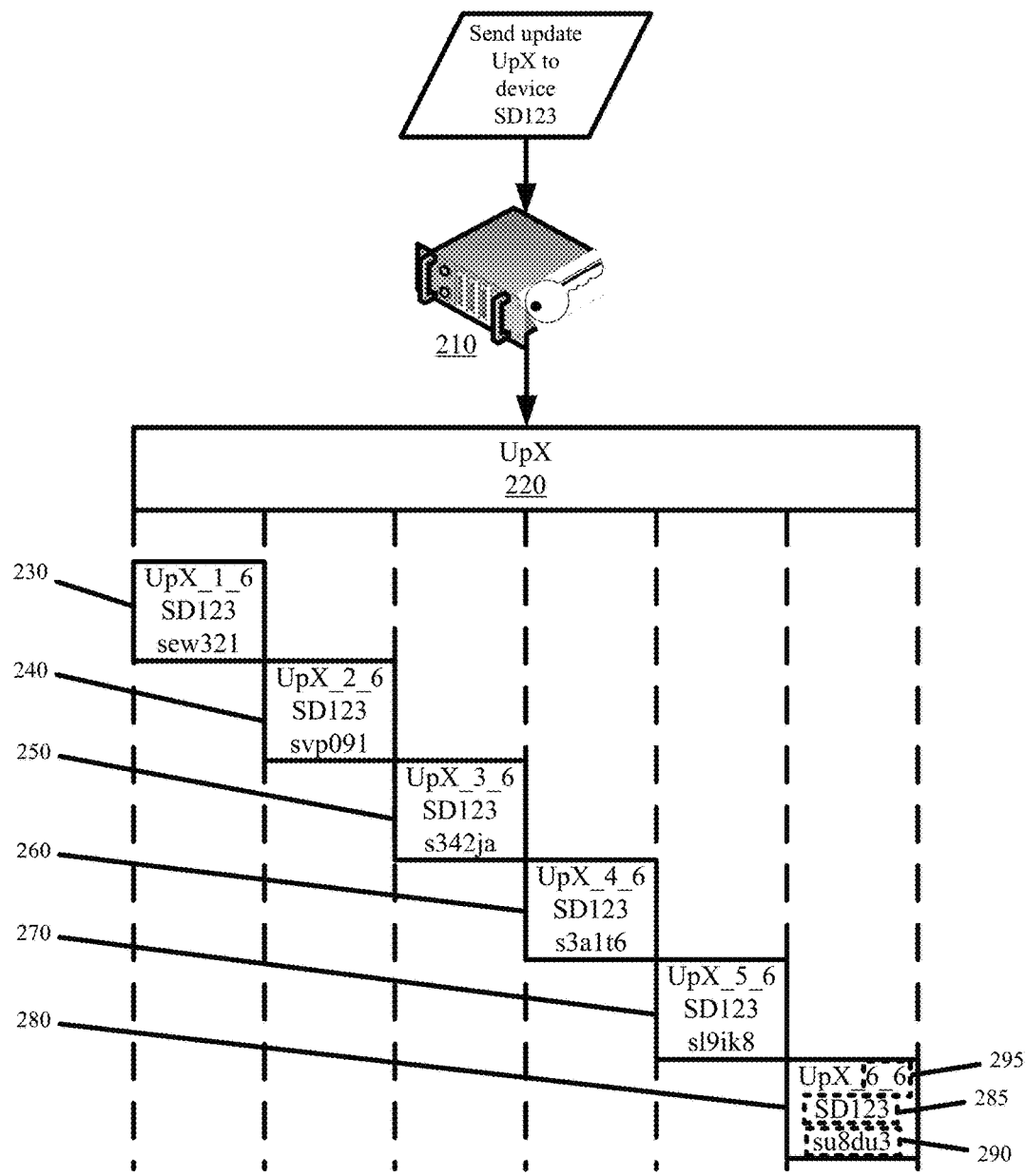
FIG. 2 conceptually illustrates a system controller or remote administrative server segmenting an update in accordance with some embodiments.

FIG. 2 conceptually illustrates a system controller 210 or remote administrative server segmenting an update 220 in accordance with some embodiments. The complete update 220 is generated or received at the system controller 210. The complete update 220 is a file. The file can be text-based, binary, or encrypted. The update 220 contents can be used to change access privilege information on one or more system devices. For instance, the update 220 can revoke from a particular system device, privileges for a first set of clients to a service accessed from that particular system device and add to the particular system device, privileges for a second set of clients to the service accessed from that particular system device. The update 220 can also change functionality and operation of the particular system device by adding or removing features or steps implemented by the particular system device.

The system controller 210 partitions the complete update into two or more fragments, wherein each fragment becomes a separate file that is a non-overlapping or partially overlapping subset of the complete file. In this figure, the system controller 210 partitions the update into six different fragments 230, 240, 250, 260, 270, and 280.

The partitioning can be arbitrary or at fixed positions (e.g., every hundred kilobytes). In other words, the fragments of the update 220 can have the same size or different sizes. In some embodiments, the size of each fragment 230-280 is set to not exceed the size of a single packet of an underlying communication protocol used to exchange messaging between a client and a system device. Fixing the fragment size to the size of a single packet is desirable because the client may connect to the system device for a very brief moment in order to request unlocking of a door or other service. Accordingly, there may be insufficient time to pass any more than one packet because the sending of multiple packets can cut off at any time should the client move out of communication range of the system device. A partially delivered update fragment would be unusable and would need to be resent by another client having that update fragment. The sizing is also important to minimize the amount of memory that is used on each client for the purposes of performing the distributed updating in accordance with some embodiments. For a large size update, the system controller can send multiple fragments to a client. The client can attempt to propagate as many segments as possible during an established connection with the system device, with the remainder of undelivered fragments being sent during a subsequent connection with the system device or by another client.

Each update fragment 230-280 produced from the system controller 210 partitioning of the FIG. 2 update 220 contains one or more of a target identifier 285, a signature (not shown), a checksum 290, and a sequence number 295. Different embodiments substitute, remove, or add other fragment parameters to these parameters.

A target identifier 285 is provided with each update, and by association, the fragments of the update. The target identifier 285 indicates the one or more system devices that are the targets of the update and that are to receive and process the update.

A global target identifier associated with a particular update fragment indicates that the update fragment is for all system devices. An individual system device target identifier associated with a particular update fragment indicates that the particular update fragment is for a specific system device. Each individual system device target identifier directly or indirectly matches to a unique identifier assigned to a system device.

In some embodiments, the system devices continuously broadcast their identifiers over a short-range wireless network to trigger client requests for services. In some other embodiments, the system devices transmit their identifiers upon a request or other action initiated by a client.

The target identifier 285 is a means by which the system controller can control the propagation of update fragments from the clients to specific system devices. In other words, the target identifier 285 can be used to control which system devices are to receive which fragment updates from which clients.

One or more target identifiers can be associated with a particular update fragment as metadata, a header parameter, query string argument, or other value linked to the update fragment. A single target identifier can also indirectly match to identifiers for two or more system devices that are to receive a particular update fragment. In other words, a target identifier can have a one-to-one association with a system device or a one-to-many association with different system devices. In some embodiments, the clients selectively send update fragments to system devices with identifiers matching those specified for the update fragments. In some other embodiments, the clients propagate any and every received update fragment to all in range system devices. The system devices then extract the target identifiers from the received fragments and determine if a received fragment is directed to them or if the received fragment should be discarded.

In some embodiments, each of the update fragments 230-280 is signed with a private key or certificate of the system controller 210. The digital signature verifies authenticity and origination of the fragments 230-280 from the system controller 210. The system devices ignore or discard any received update fragments with a digital signature that is altered or different than the digital signature of the system controller 210. In this manner, the digital signature provides means for detecting injected fragments. The digital signature can also verify integrity of the fragment contents. To verify fragment integrity with the digital signature, some embodiments produce the digital signature in part by encrypting the fragment with the private key of the system controller 210. A corresponding public key can be stored on the system devices and used to decode or decrypt received fragments. If the fragment is changed in any way, the digital signature will not match to the decoded or decrypted fragment.

The checksum 290 may be encoded into the fragment or passed in a header associated with the fragment. The checksum 290 provides alternative means with which to detect whether contents of a fragment are altered or corrupted during propagation to a system device. Other authentication codes may be included with or in the update fragments to prevent spoofing, hacking, or poisoning.

The sequence number 295 may also be encoded into the fragment or passed in a header associated with the fragment. The sequence number 295 identifies which chunk or part of an update the corresponding fragment represents. In some embodiments, the sequence number 295 also identifies the update to which the fragment pertains. This allows the system device to compile fragments of two different updates at the same time. For example, a system device may store a first update fragment with sequence number "abc_3_15" and a second update fragment with sequence number "xyz_2_6". From these sequence numbers, the system device can identify that the first update fragment is a third of fifteen fragments for an "abc" update and the second update fragment is a second of six fragments for an "xyz" update. The sequence number 295 provides the information by which a system device repackages a complete update from the individual fragments regardless of the time or order with which the system device receives the fragments from different clients.

Figure 3:
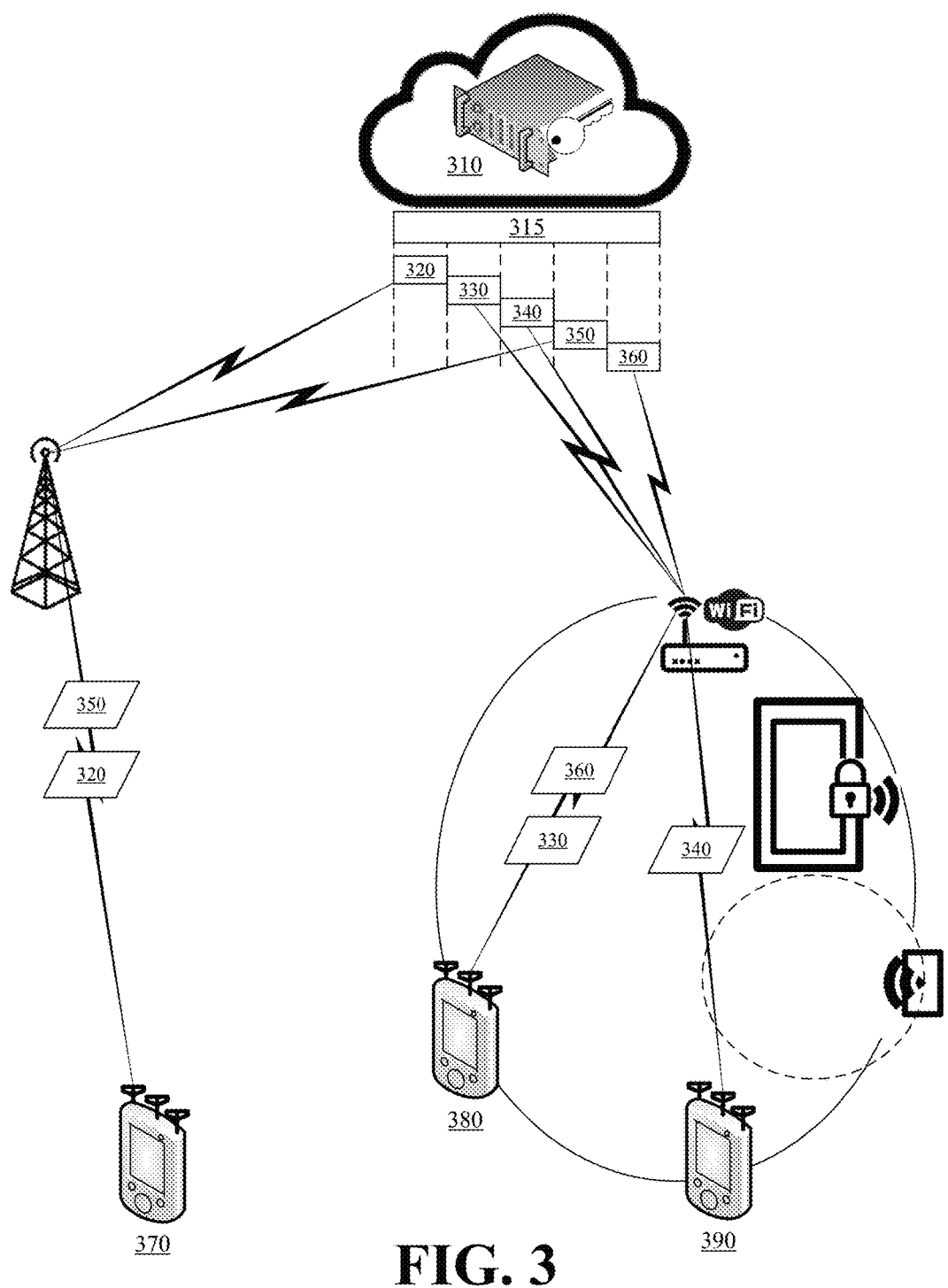
FIG. 3 conceptually illustrates a system controller distributing different fragments of a particular update to different clients in accordance with some embodiments.

FIG. 3 conceptually illustrates a system controller 310 distributing different fragments 320, 330, 340, 350, and 360 of a particular update 315 to different clients 370, 380, and 390 in accordance with some embodiments. More specifically, the figure illustrates the system controller 310 transmitting first and fourth fragments 320 and 350 to a first client 370 over a first network, second and fifth fragments 330 and 360 to a different second client 380 over a different second network, and a third fragment 340 to a different third client 390 over the second network.

In some embodiments, the system controller 310 distributes the segments 320-360 based on the order with which the clients 370-390 initiate contact with the system controller 310. The clients 370-390 may periodically initiate contact with the system controller 310 (e.g., every morning prior to the clients leaving a home network or every evening prior to the clients leaving an office network). The clients 370-390 may do so in order to update their access credentials or tokens or for other reasons. The clients 370-390 may also initiate contact in response to a user initiated action. The action is performed using the system application and can involve requesting access to a service when the client is in range of a system device providing access to the requested service.

Alternatively, the system controller 310 may initiate contact with the clients 370-390 by way of the application installed and running on the clients 370-390. The initiated contact can be selective. The system controller 310 can identify from access logs of the system devices, the frequency with which different clients access a particular system device. In updating that particular system device, the system controller 310 selectively sends update fragments to two or more clients that regularly and frequently access that particular system device.

To expedite the update fragment propagation and also for redundancy reasons, the system controller sends some of the same fragments to different sets of clients. This ensures that even if a first client receiving a particular fragment does not interface with a system device within a desired amount of time, then a second client also receiving the particular fragment can propagate the particular fragment to the system device. It is important to note that in performing the redundant distribution of update fragments to different sets of clients, the system controller still ensures for security reasons that no single client receives all or a large number of fragments of any specific update. In other words, the system controller tracks which fragments it sends to which clients. In response to the redundant propagation of update fragments, the system devices are configured with logic to reject duplicative fragments for fragments that have already been received or updates that have already been applied.

In some embodiments, fragment segments are encoded as HTTP GET or POST messages and passed from the system controller to the clients using the HTTP or HTTPS protocols. The Transport Layer Security (TLS) protocol or TLS with mutual authentication can be used to verify identities of the system controller and clients and secure transfer of the segments from the system controller to the clients. Other messaging formats and protocols can be used to exchange the fragment segments.

The system controller establishes a connection with the application running on a particular client. Over the established connection, the system controller sends one or more update fragments for one or more updates to the client. The application receives the update fragments and stores the update fragments in memory of the client device. The application may encrypt the update fragments or secure access to the portion of memory storing the update fragments. This secures the update fragments on a client device from other applications or user actions to further prevent any hacking, poisoning, modifying, or unauthorized accessing of the update fragments.

Figure 4:
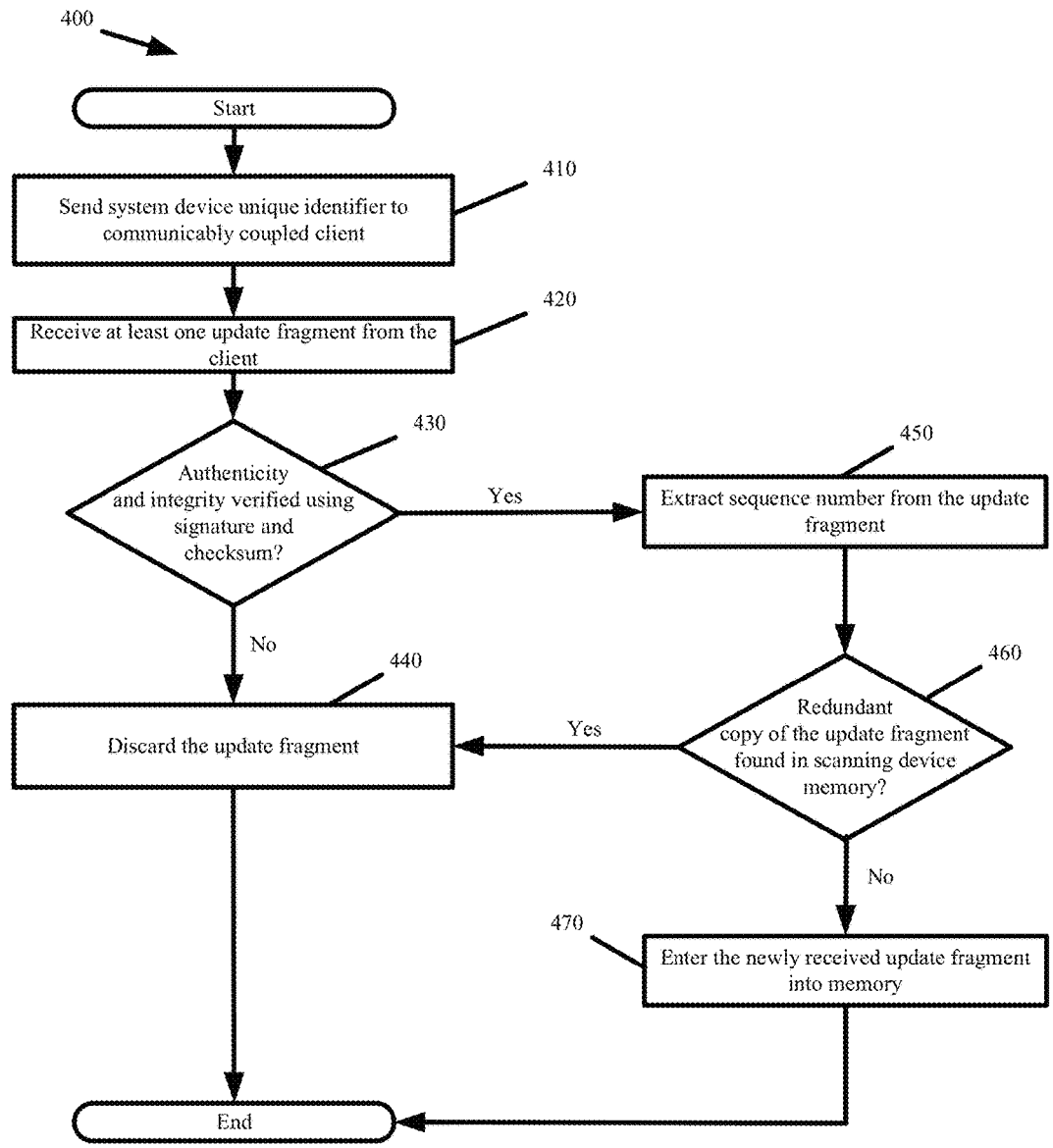
FIG. 4 presents an updating process performed by a system device in accordance with some embodiments.

FIG. 4 presents an updating process 400 performed by a system device in accordance with some embodiments. The updating process 400 is performed whenever communication is initiated between a client and the system device. In some embodiments, the client initiates the communication in response to establishing a network connection with the system device as a result of entering in communication or network range of the system device or performing a handshaking procedure with the system device. Here again, the network connection can be established using HTTP, HTTPS, TLS, TLS with mutual authentication, or other protocols. In some embodiments, the client initiates the communication in response to requesting a service from the system device. In some embodiments, the system device initiates the communication with the client as a result of detecting the client entering in the system device network or a response the client sends based on a trigger or beacon transmitted by the system device.

The process involves the system device sending (at 410) its unique identifier to the client. In response, the process receives (at 420) any update fragments the client has with target identifiers matching the unique identifier of the system device. In other words, the client application scans the target identifiers of the stored update fragments to determine if any fragments are directed to updating the system device identified by the unique identifier.

Assuming the system device receives at least one update fragment at 420, the process next verifies (at 430) authenticity and integrity of the update fragment. The verification is conducted based on the signature and/or checksum included with the update fragment. In particular, the system device uses a public key corresponding to the private key of the system controller to verify that the system controller created and sent the update fragment. The system device further uses the public key or a checksum function to determine that the contents of the update fragment did not change during transmission.

The process discards (at 440) the update fragment should the verification step fail. If verification is successful, the process obtains (at 450) a sequence number from the update fragment. The process scans (at 460) the system device memory for any redundant copies of the update fragment that may have been received at an earlier time from another client. The process discards (at 440) the newly received update fragment if a previous copy is found. In other words, the process discards the newly received update fragment if the sequence number of the newly received update fragment matches the sequence number of a fragment already stored in memory. In place of scanning the system device memory and discarding redundant copies of the same fragment, it may be faster to override the previous copy with the new copy in some embodiments. If no prior copy is found, the process enters (at 470) the newly received update fragment into memory until all fragments of the corresponding update are received and the update can be applied.

Some embodiments provide an issue_time parameter with each update or its corresponding fragments. The issue_time parameter can be used to override or ignore a previous version of an update. For instance, the system controller may issue a particular update with a first issue_time parameter. The particular update however may have been incomplete or issued with a bug. Accordingly, the system controller reissues the particular update with the modifications and a second issue_time parameter. When a system device receives a fragment of the particular update with the second issue_time parameter and stores at least one fragment of the particular update with the first issue_time parameter, the system device becomes aware of the mismatched issue times. The mismatch notifies the system device that the particular update has been reissued. Accordingly, the system device overrides any fragments with the first issue_time parameter with fragments with the second issue_time fragments.

In some embodiments, the client or user has no knowledge that the device carries the update fragments for updating the system devices. In some other embodiments, the client or user grants permission for the storing and propagation of the update fragments. The permission can be obtained at the time of registration and application installation on the client.

Figure 5:
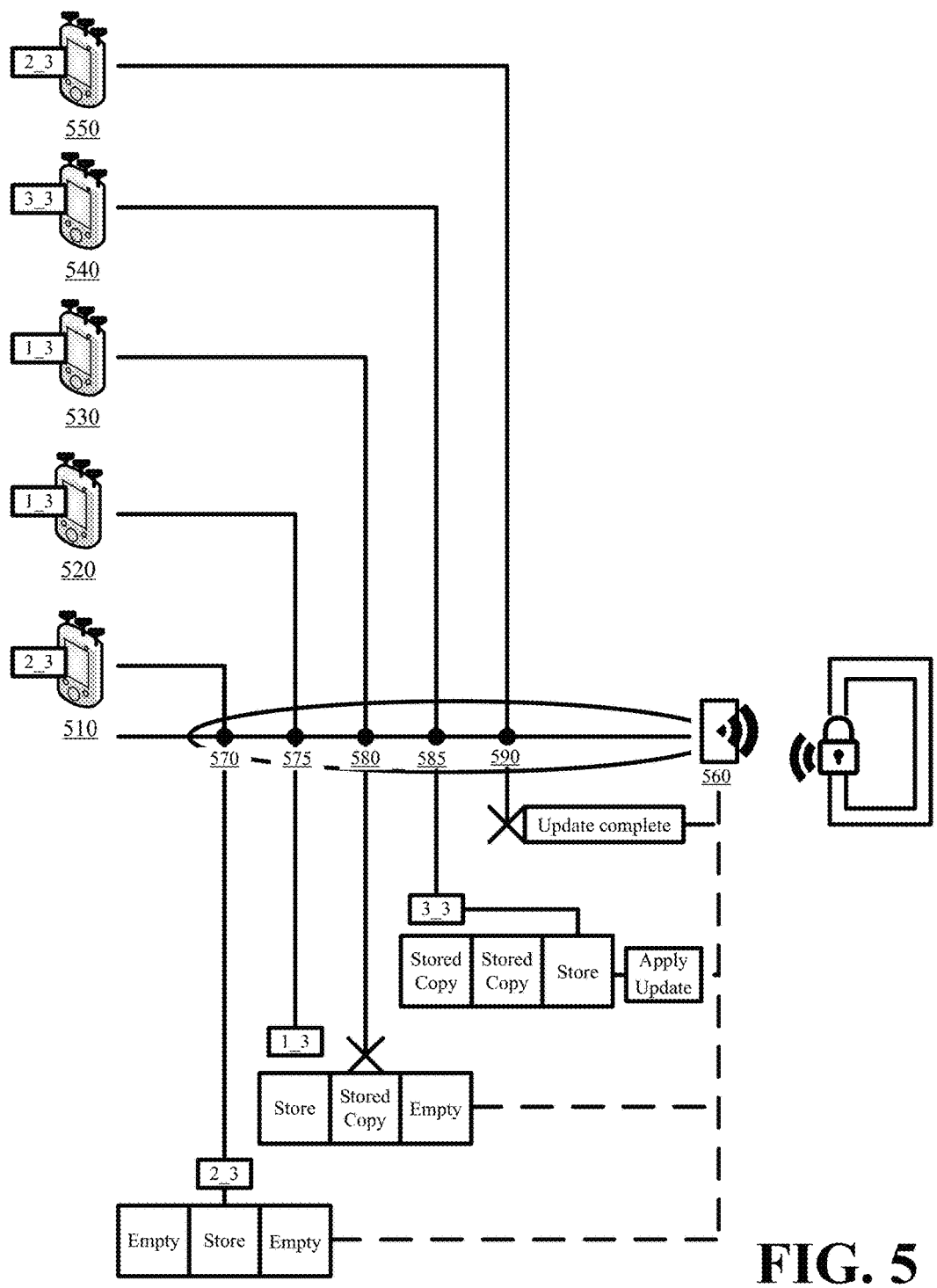
FIG. 5 illustrates five clients performing a staggered propagation of update fragment for a particular update to a system device awaiting updating in accordance with some embodiments.

Once the different fragments of a particular update are distributed to two or more clients, the clients then perform a staggered propagation of the fragments to targeted system devices upon interfacing with those system devices. FIG. 5 illustrates the staggered propagation of fragments for a particular update in accordance with some embodiments.

FIG. 5 illustrates five clients 510, 520, 530, 540, and 550 performing a staggered propagation of update fragments for a particular update to a system device 560 awaiting updating in accordance with some embodiments. The system controller has previously distributed a first fragment of the particular update to the second client 520, a second fragment of the particular update to the first client 510, a redundant copy of the first fragment to the third client 530, a third and last fragment of the particular update to the fourth client 540, and a redundant copy of the second fragment to the fifth client 550.

At a first time 570, the first client 510 moves in range of the system device 560 and is triggered to send the second fragment to the system device 560. The triggering may be in response to the first client 510 establishing a network connection with the system device 560, initiating a service request to the system device 560, or receiving a beacon from the system device 560 or a separate transmitter. The system device 560 receives, verifies, and stores the second fragment from the first client 510. As noted above, verification involves verifying that the received fragment is from the system controller, is not modified from its original state, and is not a redundant copy of a fragment already stored by the system device 560. The system device 560 determines that it has not yet received all fragments for the particular update and so buffers the second fragment for the time being.

At a subsequent second time 575, the second client 520 moves in range of the system device 560 and is triggered to send the first fragment to the system device 560. Here again, the system device 560 receives, verifies, and stores the first fragment and determines that not all fragments for the particular update have been received.

At a subsequent third time 580, the third client 530 moves in range of the system device 560 and is triggered to send the first fragment to the system device 560. During verification, the system device 560 determines that it has already received and stored a copy of the first fragment. Accordingly, the system device 560 declines or ignores the submission of the first fragment from the third client 530. If faster, the system device 560 may instead override the prior copy of the first fragment with the newly received copy.

At a subsequent fourth time 585, the fourth client 540 moves in range of the system device 560 and is triggered to send the third fragment to the system device 560. During verification, the system device 560 determines that it now has all fragments of the particular update, even though the fifth client 550 has yet to interface with the system device 560. The system device 560 proceeds to repackage the first, second, and third fragments in order before decrypting their contents using a public key that corresponds to the private key used by the system controller to encrypt the update. The system device 560 applies the update and changes its internal configuration, functionality, or operation as a result.

At a subsequent fifth time 590, the fifth client 550 moves in range of the system device 560 and is triggered to send the second fragment to the system device 560. During verification, the system device 560 determines that it has already applied the particular update that the second fragment relates to. Accordingly, the system device 560 ignores or drops the second fragment without storing the second fragment.

Figure 6:
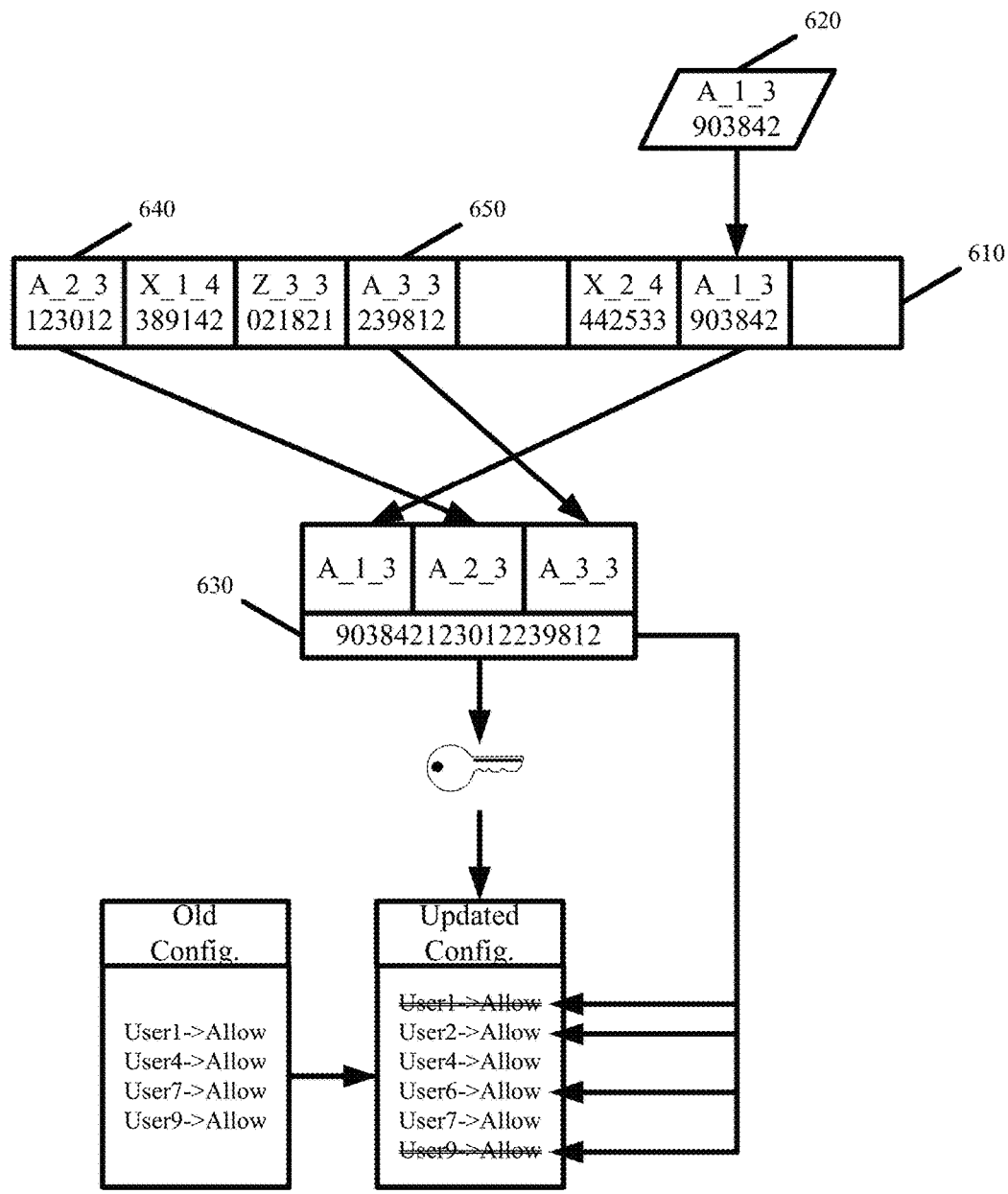
FIG. 6 conceptually illustrates a system device applying an update after receiving all fragments of the update in the staggered, non-sequential, and distributed manner of some embodiments.

FIG. 6 conceptually illustrates a system device applying an update after receiving all fragments of the update in the staggered, non-sequential, and distributed manner of some embodiments. The figure illustrates different fragments for different updates residing in different sections of the system device memory 610 and the system device receiving the last missing fragment 620 for a particular update 630. In response to receiving the last missing fragment 620 of the particular update 630, the system device packages the fragments 640, 650, and 620 of the particular update 630 in order based on the sequence number associated with each fragment. The system device 610 then decrypts the reordered and complete set of fragments 620, 640, and 650 to derive the complete update 630. It should be noted that for security reasons the update may be encrypted before fragmentation. In doing so, the fragments cannot be individually decrypted and the update is revealed after decrypting all fragments together with the correct ordering. In this figure, the system device changes its internal configuration with the decrypted update.

Different deletion embodiments are provided to prevent the same client from sending the same fragment to the same system device when the client interfaces with the same system device at different times. One such deletion embodiment leverages the target identifier associated with each update fragment. If the target identifier for a particular update fragment identifies a single system device and the client sends the particular update fragment to that system device, the client or application running thereon deletes the particular fragment from memory. Alternatively, the system device can send an instruction to cause the client or application running thereon to delete the particular fragment. If the target identifier for a particular update fragment identifies two or more system devices and the client sends the particular update fragment to one of the identified system devices, the client or application running thereon can update the target identifier for the particular fragment and remove the identification of that system device from the target identifier. In another deletion embodiment, the target identifier may be a global identifier specifying applicability of an update to all system devices. In some such embodiments, the system controller associates a time-to-live (TTL) parameter with each fragment of the global update. The clients continue sending all received fragments to any system devices they interface with until the TTL parameter for those fragments expires. Thereafter, the clients or applications thereon delete the fragments.

In some embodiments, the exchange of update fragments between a system device and different clients is controlled by the system device. In some such embodiments, the system device is configured to query for new update fragments whenever a client connects to that system device. For instance, a system device establishes a connection with a particular client after successfully completing the Bluetooth handshake with the particular client. Thereafter, the system device may send a query message including the system device identifier to the particular client. The query message can request the application of the client to send any update fragments with target identifiers matching the system device's identifier. In some embodiments, the query message can request specific update fragments with sequence numbers to avoid the client from sending redundant copies of fragments already received by the system device. For example, if the system device has already received first and second fragments of a particular update, the system device may modify the query to request the sequence number for the third fragment of that particular update. Alternatively, the system device query can request the client to send the first fragment of any new update it may have. The client can respond to the queries with the requested fragments or reply indicating that it does not store any fragments meeting the query criteria.

Figure 7:
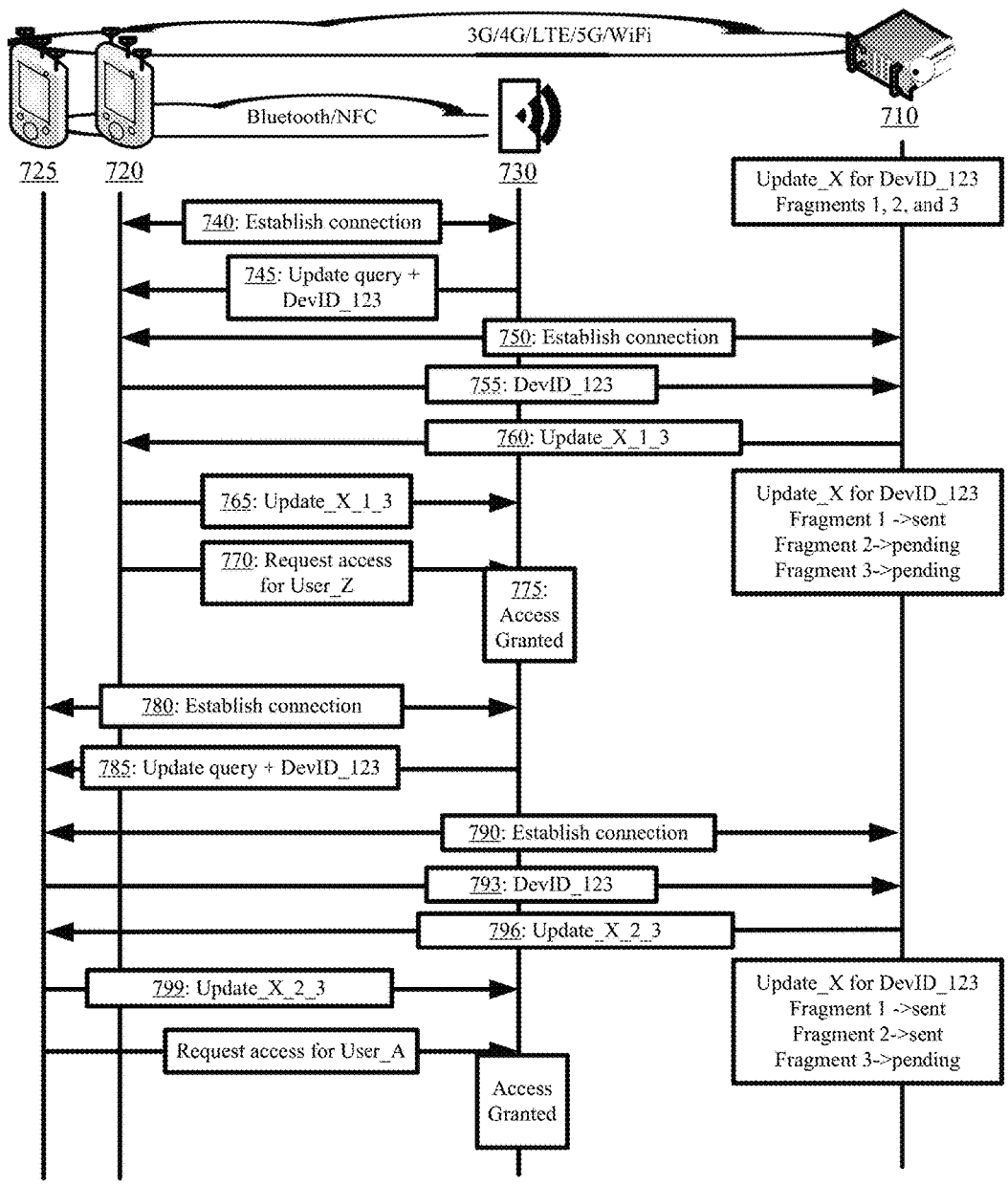
FIG. 7 illustrates the system controller piggy-backing on connections between different clients and a system device in order to propagate update fragments to the system device.

In some other embodiments, the system controller controls the distribution and propagation of fragment updates to the system devices by leveraging connections established between different clients and a particular system device at the time the connections are made. FIG. 7 illustrates the system controller 710 piggy-backing on connections between different clients 720 and 725 and a system device 730 in order to propagate update fragments to the system device 730 while the connections between the clients 720 and 725 and the system device 730 remain active.

The figure illustrates a first client 720 establishing (at 740) a connection with the system device 730 over a first network (i.e., short-range wireless network) once the first client 720 is in range of the system device 730. The system device 730 sends (at 745) an update query message with its identifier to the first client 720 over the first network.

The update query causes the application running on the first client 720 to establish (at 750) a connection back to the system controller 710 over a different second network (i.e., long-range wireless network). The first client 720 application sends (at 755) the system device identifier to the system controller 710. The system controller 710 queries an internal table to determine if that particular system device 730 has any pending updates or is in the process of being updated. In this figure, the system controller 710 determines that there is a new update for that system device 730 and sends (at 760) a first fragment of that new update over the second network to the first client 720. The system controller 710 modifies its internal table to track that the first fragment of the new update was sent to the particular system device 730 by way of the first client 720. The first client 720 application receives the first fragment from the system controller 710 over the second network and relays (at 765) the first fragment to the system device 730 over the first network. Contemporaneously, the first client 720 application uses the connection with the system device 730 to request (at 770) access to a service and terminates the connection once the service access is granted (at 775) by the system device 720.

The updating continues when a second client 725 subsequently establishes (at 780) a connection with the same system device 730 over the first network in order to also request access to the service. The system device 730 sends (at 785) an update query and its identifier to the second client 725.

Here again, the update query causes the second client 725 application to establish (at 790) a connection back to the system controller 710 over the second network and send (at 793) the system device identifier to the system controller 710. From the identifier, the system controller 710 determines that it has already sent the first fragment for the new update. Accordingly, the system controller 710 now sends (at 796) the second fragment for the new update to the second client 725 application over the second network. The second client 725 application relays (at 799) the second fragment to the system device 730 over the first network. The process continues until all fragments of the new update are passed to the system device and the system device is updated.

It should be noted that in FIG. 7, the sending of a single fragment to a client can involve a variable number of packets and a fragment of varying size. The fragment sizes can change based on the speed, bandwidth, and temporal length of the connection between the system controller and the client as well as the same properties for the connection between the client and the system device.

Client, server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 8:
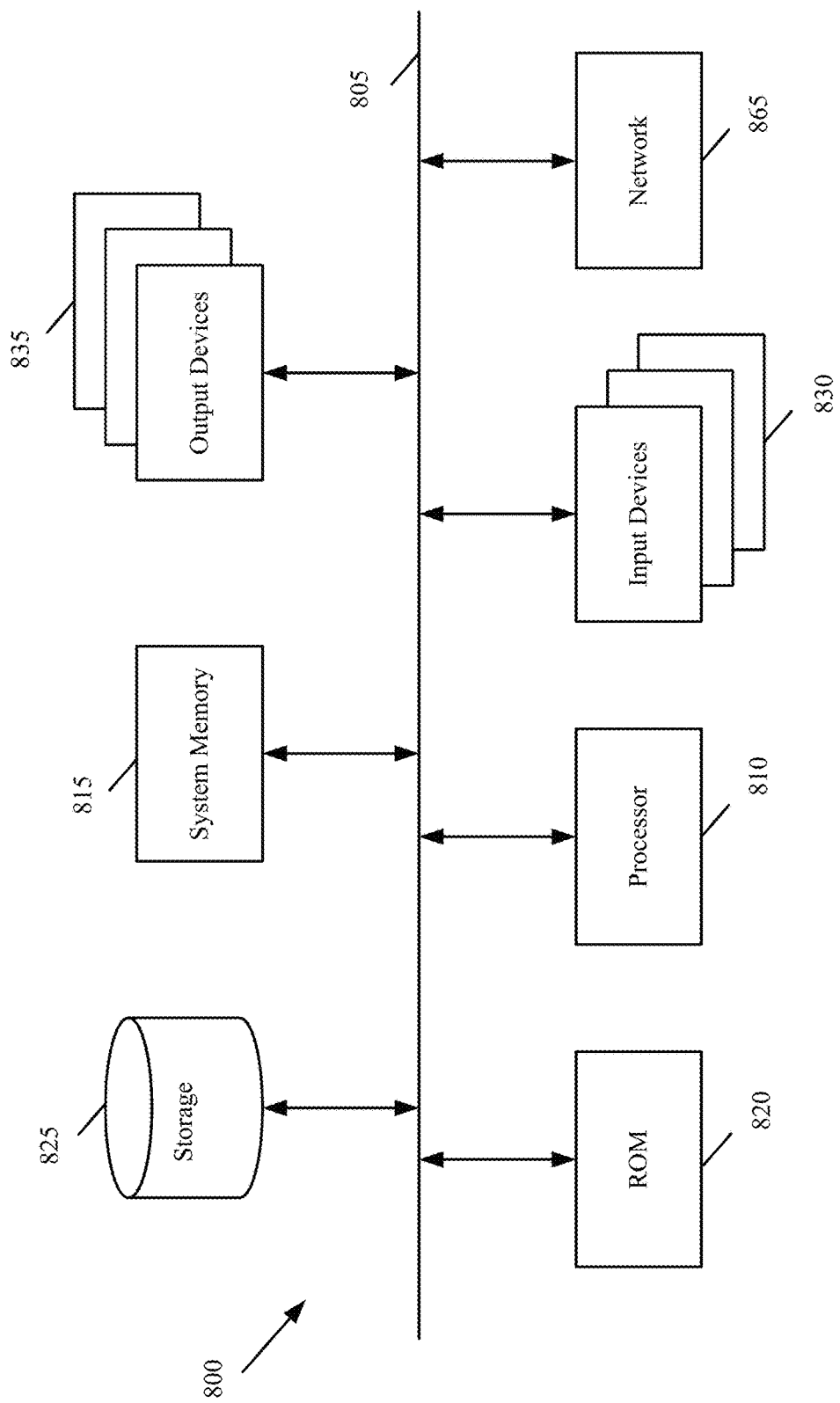
FIG. 8 illustrates a client or server with which some embodiments are implemented.

FIG. 8 illustrates a client or server with which some embodiments are implemented. Such a computer system includes various types of computer-readable mediums and interfaces for various other types of computer-readable mediums that implement the various methods and machines described above (e.g., request director, caching server, etc.). Computer system 800 includes a bus 805, a processor 810, a system memory 815, a read-only memory 820, a permanent storage device 825, input devices 830, and output devices 835.

The bus 805 collectively represents all system, peripheral, and chipset buses that communicatively connect the numerous internal devices of the computer system 800. For instance, the bus 805 communicatively connects the processor 810 with the read-only memory 820, the system memory 815, and the permanent storage device 825. From these various memory units, the processor 810 retrieves instructions to execute and data to process in order to execute the processes of the invention. The processor 810 is a processing device such as a central processing unit, integrated circuit, graphical processing unit, etc.

The read-only-memory (ROM) 820 stores static data and instructions that are needed by the processor 810 and other modules of the computer system. The permanent storage device 825, on the other hand, is a read-and-write memory device. This device is a non-volatile memory unit that stores instructions and data even when the computer system 800 is off. Some embodiments of the invention use a mass-storage device (such as a magnetic or optical disk and its corresponding disk drive) as the permanent storage device 825.

Other embodiments use a removable storage device (such as a flash drive) as the permanent storage device. Like the permanent storage device 825, the system memory 815 is a read-and-write memory device. However, unlike storage device 825, the system memory is a volatile read-and-write memory, such as random access memory (RAM). The system memory stores some of the instructions and data that the processor needs at runtime. In some embodiments, the processes are stored in the system memory 815, the permanent storage device 825, and/or the read-only memory 820.

The bus 805 also connects to the input and output devices 830 and 835. The input devices enable the user to communicate information and select commands to the computer system. The input devices 830 include alphanumeric keypads (including physical keyboards and touchscreen keyboards), pointing devices. The input devices 830 also include audio input devices (e.g., microphones, MIDI musical instruments, etc.). The output devices 835 display images generated by the computer system. The output devices include printers and display devices, such as cathode ray tubes (CRT) or liquid crystal displays (LCD).

Finally, as shown in FIG. 8, bus 805 also couples computer 800 to a network 865 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 800 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
partitioning an update for a distributed system device into a plurality of update fragments at a system controller, each update fragment of the plurality of update fragments storing a different and non-overlapping portion of the update for the system device;
distributing different update fragments of the plurality of update fragments from the system controller to different remote clients of a plurality of remote clients over a first wireless network, wherein said distributing prevents any remote client from having access to all of the update as a result of each remote client receiving a different update fragment of the plurality of update fragments and no remote client receiving all of the plurality of update fragments;
receiving a different update fragment from each remote client at the system device via a different second wireless network, wherein the second wireless network has less range than the first wireless network, and wherein said receiving comprises:
establishing, at different times, a different network connection between each particular remote client of the plurality of remote clients and the system device in response to the particular remote client entering in range of the second wireless network;
obtaining at the system device, at least a first update fragment of the plurality of update fragments from a first remote client of the plurality of remote clients using a first network connection that is established with the system device over the second wireless network at a first time when the first remote client enters in range of the second wireless network, and at least a second update fragment of the plurality of update fragments from a second remote client of the plurality of remote clients using a different second connection that is established with the system device over the second wireless network at a different second time when the second remote client enters in range of the second wireless network;
decoding, at the system device, the update in response to receiving different update fragments from each of the plurality of remote clients and all of the plurality of update fragments from the plurality of remote clients, and reordering the plurality of update fragments according to a sequence number of each update fragment, wherein said decoding comprises combining the different update fragments to form the update;
performing a local update of the system device based on the update.

2. The method of claim 1, wherein said receiving is further in response to each remote client requesting access to a service controlled by the system device.

3. The method of claim 2 further comprising unlocking a door for a set of the plurality of remote clients with the system device in response to said system device authorizing access requests from the set of remote clients while simultaneously receiving one or more of the update fragments from the set of remote clients.

4. The method of claim 1, wherein said partitioning comprises signing each update fragment of the plurality of update fragments with an identity of the system controller.

5. The method of claim 1, wherein said partitioning comprises assigning a different sequence number to each update fragment of the plurality of update fragments by the system controller.

6. The method of claim 1, wherein said partitioning comprises assigning a particular target identifier to each update fragment of the plurality of update fragments by the system controller, the particular target identifier matching to at least an identifier of the system device.

7. The method of claim 6 further comprising receiving at the system device from a remote client, an update fragment comprising a different target identifier not matching the identifier of the system device, and dropping said update fragment at the system device.

8. An access control system comprising:
a system controller managing updates to a configuration of a plurality of remotely distributed system devices, and further managing access rights of a plurality of clients to at least one service at the plurality of remotely distributed system devices, the system controller comprising a first network radio that communicates via a first wireless network technology, wherein the system controller remotely distributes different update fragments from a plurality of update fragments for a system device configuration update across different clients of the plurality of clients using the first network radio with each client receiving a different update fragment of the plurality of update fragments and no client receiving all of the plurality of update fragments or all of the system device configuration update; and
a particular system device of the plurality of remotely distributed system devices controlling access to said service at a particular site, the particular system device comprising:
(i) a different second network radio that communicates via a different second wireless network technology, wherein the particular system device receives different update fragments of the plurality of update fragments from the different clients of the plurality of clients via the second network radio upon the different clients entering communication range of the second wireless network technology;
(ii) memory storing:
a first set of the plurality of update fragments in response to a first client of the plurality of clients transmitting the first set of update fragments to the particular system device at a first time coinciding with the first client entering said communication range, and
a second set of the plurality of update fragments in response to a different second client of the plurality of clients transmitting the second set of update fragments to the particular system device at a different second time coinciding with the second client entering said communication range;
(iii) a processor changing the system device configuration by reordering the first and second sets of update fragments, that include all update fragments of the plurality of fragments, based on a sequence number of each update fragment, decoding the system device configuration update from a reordering of the first and second set of update fragments, and applying the system device configuration update to the system device configuration.

9. The system of claim 8, wherein said first wireless network technology is a long-range wireless network technology, and said second wireless network technology is a short-range wireless network technology, and wherein said particular system device is located a distance from the system controller preventing connectivity with the system controller using said second wireless network technology.

10. The system of claim 8, wherein said memory further stores an old set of access privileges for the plurality of clients, the plurality of update fragments comprises a new set of access privileges for the plurality of clients, and the processor changes the system device configuration by replacing the old set of access privileges in the memory with the new set of access privileges.

11. The system of claim 8, wherein said memory further stores an old operating configuration for the particular system device, the plurality of update fragments comprises a new operating configuration, and the processor changes the system device configuration by changing from the old operating configuration to the new operating configuration.

12. The system of claim 8, wherein the plurality of clients are operated by a plurality of different users independent of the access control system, and wherein each client of the plurality of clients comprises said first network radio and said second network radio.

13. A method comprising:
generating an update to a configuration of a remote device at a system controller;
dividing said update into a plurality of fragments at the system controller;
assigning a value, corresponding to a sequence number, to each fragment of the plurality of fragments at the system controller;
distributing, from the system controller, different fragments of the plurality of fragments across different user mobile devices of a plurality of user mobile devices via a first wireless network, wherein said distributing prevents any user mobile device from having access to all of the update;
receiving, at the remote device, different sets of the plurality of fragments from different user mobile devices at different times when each user mobile device enters in range of a different second wireless network used to communicate with the remote device, wherein said receiving comprises the different sets of the plurality of fragments arriving at the remote device with the values out of sequential order;
decoding, at the remote device, the update in response to said receiving and reordering the fragments according to the value assigned to each fragment, wherein said decoding comprises combining the plurality of fragments to form the update; and
updating the configuration of the remote device using the update resulting from said decoding.

14. The method of claim 13 further comprising encrypting each fragment of the plurality of fragments with a private key.

15. The method of claim 14, wherein said updating comprises determining all fragments of the plurality of fragments are received at the remote device, reconstructing the update by decrypting the plurality of fragments with a public key corresponding to said private key, and applying said update at the remote device.

16. The method of claim 13, wherein the plurality of user mobile devices initially communicate with the system controller over a long-range first network and subsequently communicate with the system device over a short-range second network.

* * * * *